United States Patent [19]

Yokomizo

[11] Patent Number: 4,531,240

[45] Date of Patent: Jul. 23, 1985

[54] DATA COMMUNICATION SYSTEM

[75] Inventor: Yoshikazu Yokomizo, Kawagoe, Japan

[73] Assignee: Canon Kabushiki Kaisha, Tokyo, Japan

[21] Appl. No.: 426,948

[22] Filed: Sep. 29, 1982

[51] Int. Cl.³ .............................................. H04B 9/00
[52] U.S. Cl. ...................................... 455/607; 307/66; 340/825.05; 455/612
[58] Field of Search ............... 455/601, 606, 607, 612, 455/8, 14; 358/256; 340/825.05; 375/3, 4; 307/64, 66, 85, 86

[56] References Cited

U.S. PATENT DOCUMENTS

| 4,159,470 | 6/1979 | Strojny et al. | 340/825.05 |
| 4,207,598 | 6/1980 | Reich et al. | 358/257 |
| 4,406,513 | 9/1983 | Raphael | 455/601 |

FOREIGN PATENT DOCUMENTS

| 53-84503 | 7/1978 | Japan | 455/601 |
| 55-93337 | 7/1980 | Japan | 455/612 |
| 55-147844 | 11/1980 | Japan | 455/612 |
| 56-164643 | 12/1981 | Japan | 455/601 |

OTHER PUBLICATIONS

Rawson—"A Fiber Optical Relay"–Optical Engineering–Jul./Aug. 1980, vol. 19, No. 4, pp. 628–629.

Primary Examiner—Joseph A. Orsino, Jr.
Attorney, Agent, or Firm—Fitzpatrick, Cella, Harper & Scinto

[57] ABSTRACT

An improved image forming apparatus for data communication system which makes it possible to keep on signal transmission by changing signal transmission path in relation to the operating conditions of the apparatus. The apparatus is constructed with an image signal processor, an input/output unit for governing input and output of signals between the image signal processing device and signal transmission path, first power source for supplying electric power to drive the image signal processor and the input/output unit, and second power source for supplying electric power to the input/output unit when the first power source is not in operation.

5 Claims, 3 Drawing Figures

DATA COMMUNICATION SYSTEM

BACKGROUND OF THE INVENTION

1. Field of the Invention

This invention relates to a data communication system, and, more particularly, it is concerned with an image forming apparatus which constitutes a part of the data communication system for carrying out transmission of information such as image information, etc., through signal transmission paths such as optical fiber cables, and so forth.

2. Description of the Prior Art

There have so far been proposed or put into practice various systems for performing transmission and receipt of informations between distant locations. The system is, in general, of such a construction that information processing devices having signal transmission and receiving functions are put into connection by means of signal transmission channels, through which the informations are sent. As one example of such image transmission system, it may be contemplated that a reading device to read an image original and to form image signals is joined with a printing device to record the image based on the image signals by the signal transmission paths such as, for example, optical fiber cables so that the image information which has been read at the first location may be recorded at the second location. In the system of performing transmission and receipt of information between or among a plurality of reading and printing devices which are connected by signal transmission paths using the optical communication system, it is often necessary that a repeater be located at every several kilometers to ten and several kilometers, when the distance between the neighboring devices is fairly long, to compensate attenuation in the light signals being transmitted through the signal transmission paths connecting the devices. The electric power supply for driving the repeaters is generally taken from the commercial power source, or from a house generator provided in each of the repeaters. However, when any one of the repeaters stops its operation due to interruption in the current supply or trouble with the generator, the communication system as a whole would be interrupted by the defunct repeater to result in disabled communication.

On the other hand, a communication system, wherein signal processors to carry out operations such as image formation, etc., based on information sent through the signal transmission path are connected in a loop, is generally of such a construction that it may determine whether the signals from the transmitter have been duly received at the receiving station or not, by return of the signals to the transmitting station from which they were originated, around through the loop. In this communication system, it is indispensable that the power supply be always given to the entire signal processing devices connected in loop, even when some of them alone are used for the communication operations, and yet the whole devices be in regular operative conditions. Apparently, such system wastes the electric power because of the power supply to those devices not in need of use.

SUMMARY OF THE INVENTION

In view of the above-noted problem points of with the conventional apparatus, it is an object of the present invention to provide an improved image forming apparatus for the data communication system which is able to maintain smooth and uninterrupted flow of information.

It is another object of the present invention to provide an image forming apparatus which does not put a stop to the data communication system in operation, even when the signal processing cannot be done at all.

It is still another object of the present invention to provide an image forming apparatus which is able to change the signal transmission paths depending on the condition of operations of the signal processing devices.

It is another object of the present invention to provide an image forming apparatus which makes it possible to effect the signal transmission between those signal processing devices connected to one another through a device which is not in need of operation.

The foregoing objects, other objects as well as specific construction, operations, and resulting effects of the image forming apparatus according to the present invention will become clearer and more understandable from the detailed statement to come hereinafter, when read in connection with the accompanying drawing.

DETAILED DESCRIPTION OF THE PREFERRED EMBODIMENT

In the following, detailed accounts of the present invention will be given in reference to the accompanying drawing.

Figure 1:
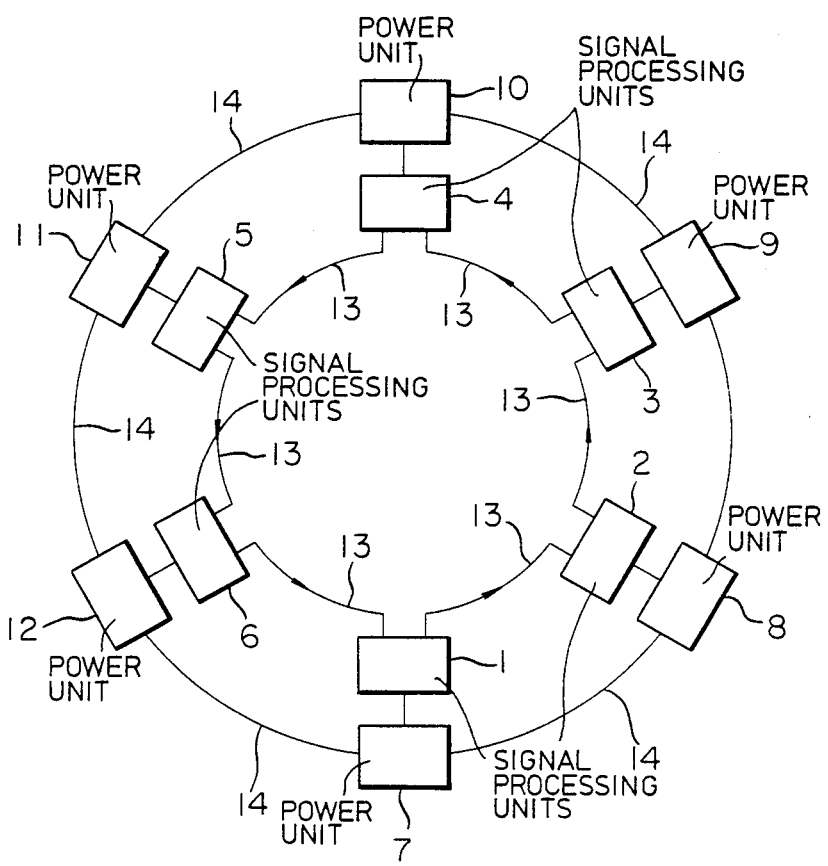
FIG. 1 is a schematic diagram showing an optical data bus communication system, in which the present invention is adopted.

As seen from FIG. 1, which is a schematic block diagram of an optical data bus communication system, wherein the image forming apparatus according to the present invention is in the loop-connection by means of light transmission paths, reference numerals 1 to 6 designate the electronic devices, for example image processing terminal devices such as computers, word processors, and repeaters or the like joining terminals and so on; numerals 7 to 12 refer to power source devices for each of the electronic devices, which are, for example, transformers for commercial power, private generators, etc. Numeral 13 denotes the optical fibers to effect the signal transmission; and a reference numeral 14 designates power source buses for joining the power source devices 7 to 12. In such communication system as described above, wherein the electronic devices are joined in loop by the optical fibers, each of the electronic devices has a photo-to-electric converter which converts light signal inputs through the optical fibers into electrical signals and an electric-to-photo converter which converts the electric signals formed in the electronic device to light signals and sends out them to the optical fibers.

In the conventional data communication system, if any one of the power source devices 7 to 12 becomes inoperative, the abovementioned two converters to be actuated by the power source also do not operate, whereby the signal transmission path in the looped structure becomes non-continuous, and, as a result, the communication system as a whole is interrupted. With a view to avoiding this interrupted condition, the data communication system of the present invention is so designed that the power source devices 7 to 12 in the communication system are mutually connected by the power source bus 14 so that electric power may always be supplied to the above-mentioned two converters from any of the power source devices still in operation, even when stoppage takes place in any of these power source devices. In this way, whenever at least one of the electronic devices is in operation (i.e., whenever at least one of the power source devices is in operation), the two converters placed in each of these electronic devices are all put in operation, and there is no discontinuation to take place in the signal transmission by this communication system.

Figure 2:
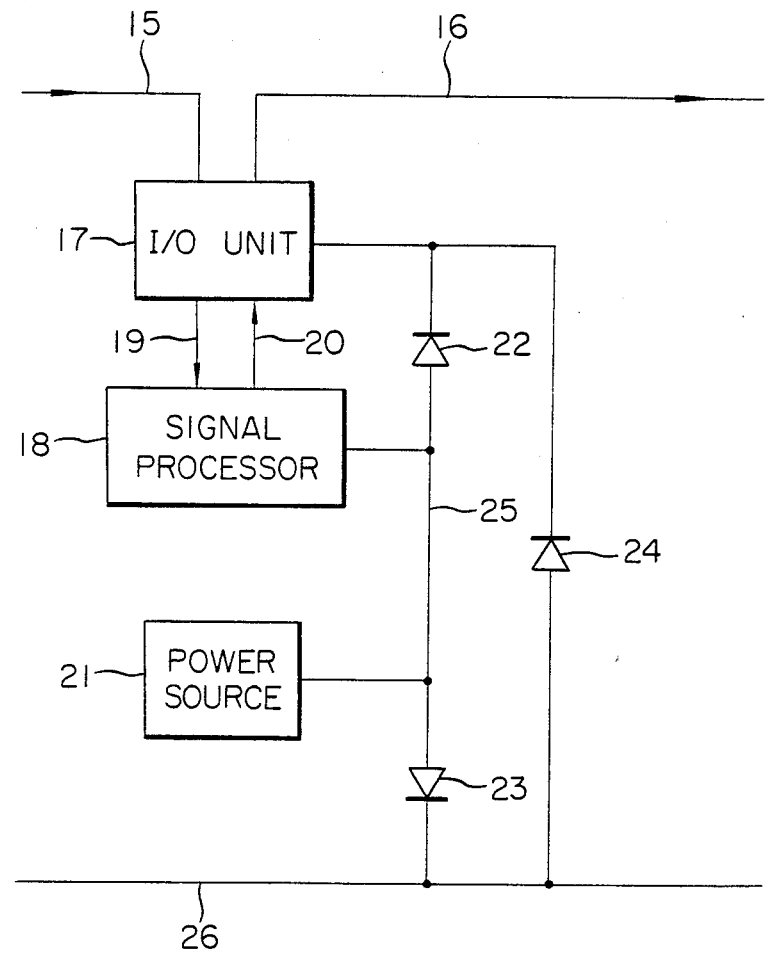
FIG. 2 is a block diagram showing one embodiment of a circuit construction of an electronic device, to which the present invention is applied.

FIG. 2 gives one practical example of the image forming apparatus constructed with the power source device and the electronic device, and to which the concept of the present invention is applied. In the drawing, reference numeral 15 designates a signal input line made of the optical fiber; numeral 16 refers to a signal output line also made of the optical fiber; 17 designates an input/output device including the photo-to-electric converter and the electric-to-photo converter; and 18 refers to a signal processing device to process input signals (e.g. image reading) and form signals for output (e.g. image recording). Thus, the electronic device in FIG. 1 is made up of the input/output device 17 and the signal processing device. Reference numerals 19 and 20 designate electric signal lines to transmit electric signals (e.g., image information) from the input/output device 17 to the signal processing device 18, or vice versa; 21 refers to the power source device corresponding to elements 7 to 12 in FIG. 1; 22, 23 and 24 denote diodes; 25 is a power supply line to feed electric power from the power source device 21 to the input/output device 17 and the signal processing device 18; and 26 is a power source bus equal to element 14 in FIG. 1, the power supply being done from the power source device 21 through the diode 23, and the power source bus 26 feeding the power to the input/output device 17 through the diode 24.

In FIG. 2, when the power source device 21 becomes inoperative, and no power is supplied to the input/output device 17 and the signal processing device 18 through the power supply line 25, the signal processing device 18 of the electronic device no longer works. However, if at least one power source device in the entier communication system is in operation, the current supply is made to the power source bus 26 from the power source device which is in operation. From this power source bus 26, the power supply is further made to the input/output device 17 through the diode 24. As a result, even if the power source device 21 at one terminal is inoperative, the electric power can be supplied to the input/output device 17, and hence whenever a power source device at a other terminal is in operation, the device 17 continues its operations. In this way, even when the power source device 21 is not working, there is no possibility of the signal transmission undergoing interruption.

Figure 3:
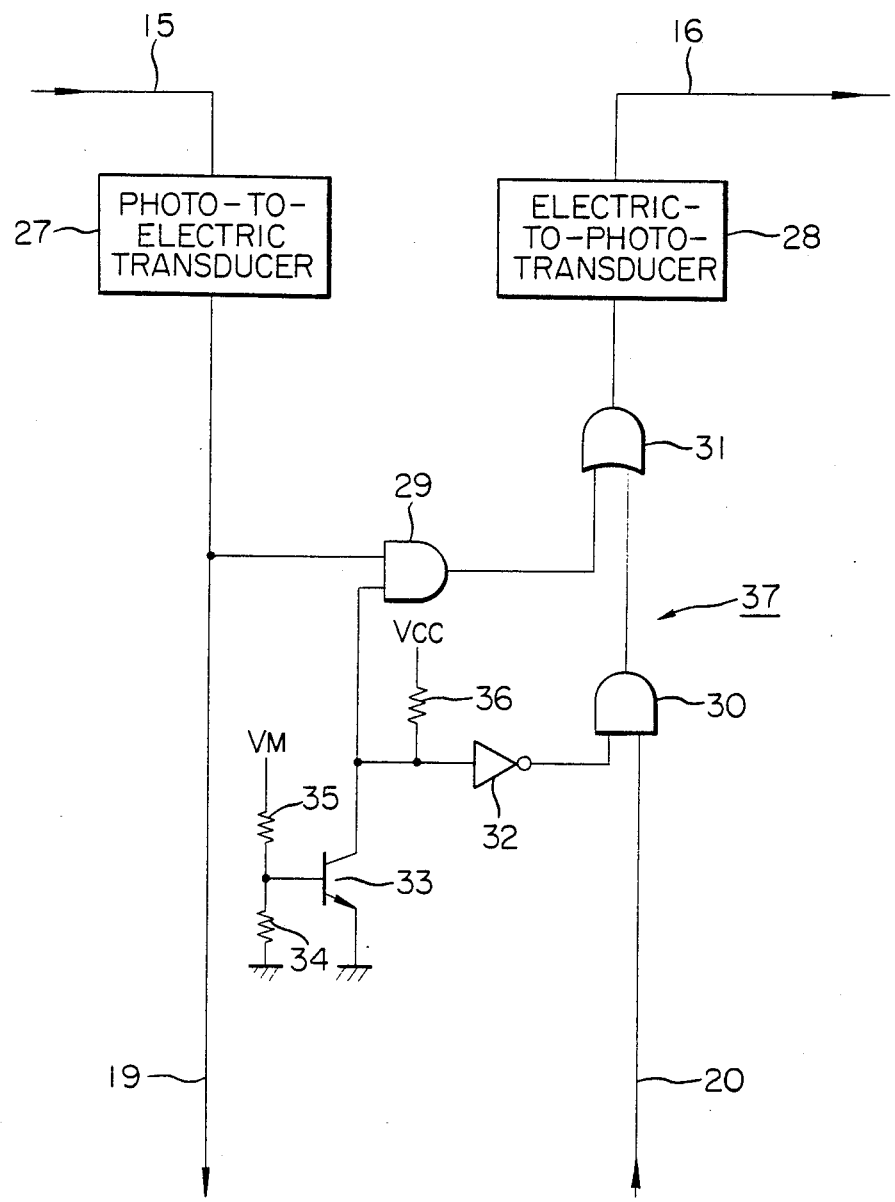
FIG. 3 is a detailed block diagram of the circuit of the input/output device shown in FIG. 2.

FIG. 3 gives one example of the circuit construction of the input/output device in FIG. 2, it being understood that those structual elements common to FIG. 2 are designated by the same reference numerals, and the explanations for them are omitted.

In the drawing, reference numeral 27 designates the photo-to-electric converter which converts light signals input through the signal input line 15 made of the optical fiber into electric signals, and sends out the converted electric signals to the electric signal line 19 as the output; numeral 28 refers to the electric-to-photo converter which converts electric signals input through the electric signal line 20 into light signals, and sends out the resulting light signals to the signal output line 16 made of the optical fiber; 29 and 30 denote "AND" gates; 31 is an "OR" gate; 32 is an inverter; 33 is a transistor; and 34, 35 and 36 refer to fixed resistors. These component parts construct a gate circuit 37. The photo-to-electric converter 27, the electric-to-photo converter 28, the "AND" gates 29, 30, the "OR" gate 31, and the inverter 32 are put to driving with the power supply from the cathode of the diodes 22, 24 in FIG. 2 through a power source line (not shown). "Vcc" denotes a positive voltage.

The transistor 33 in gate circuitry 37 is to detect whether the power source device 21 shown in FIG. 2 is in operation or not. If the power source device 21 is working, a voltage $V_M$ is applied to a serial circuit of the fixed resistors 35 and 34 through the power supply line 25 in FIG. 2, whereby the transistor 33 is turned on. On the other hand, if the power source device 21 is not in operation, the transistor 33 is turned off. While the transistor 33 is turned on, the "AND" gate 29 is turned off, and the other "AND" gate 30 is turned on through the inverter 32. By the "on" operation of the transistor 33, an electrical signal output from the photo-to-electric converter 27 is sent into the signal processing device 18 shown in FIG. 2 through the electric signal line 19, and an electric signal output from the signal processing device 18 is sent into the electric-to-photo converter 28 through electric signal line 20 by way of the "AND" gate 30 and "OR" gate 31. On the other hand, when the transistor 33 is turned off, i.e., when the power source device 21 is not working, the "AND" gate 29 is turned on, and the "AND" gate 30 is turned off through the inverter 32. As the result, the electric signal output from the photo-to-electric converter 27 takes a by-pass from the signal processing device 18, and goes directly into the input of electric-to-photo converter 28, through the "AND" gate 29 and the "OR" gate 31. In this instance, the photo-to-electric converter 27, the electric-to-photo converter 28, the "AND" gates 29, 30, and the "OR" gate 31 are driven by a power supply from other power source still working in the communication system through the power source bus 26 and the cathode of the diode 24, as already mentioned in the foregoing.

As a result of this, even when the power source device 21 is not in operation, the input/output device 17 in FIG. 2 having both photo-to-electric converter 27 and electric-to-photo converter 28 is kept in operation by another working power source device in the communication system. Further, when non-operation of the power source device 21 is detected, the input/output device puts the gate circuit 37 into operation to make direct connection between the output of the photo-to-electric converter 27 and the input of the electric-to-photo converter 28, and sends out to the signal output line 16 the input informations taken thereinto from the signal input line 15, thereby preventing the communication system from interruption caused by non-operation of the power source device.

By the way, non-operation of the power source deivce includes, besides the abovementioned current supply stop and trouble in the private generator, those situations when the power source connection is not effected by users to some electronic devices in the communication system, which are not in need of the signal transmission, or when the electronic device comes to the end of its use and the power source switch is turned off. That is to say, the present invention has made it possible for any terminal which desires to perform signal transmission, to utilize the communication system according to the power thrown in only at that terminal.

It should also be noted that, though the embodiment of the present invention as described in the foregoing makes use of the optical data bus communication system, in which the electronic devices and the power source devices are loopconnected by the optical fibers, the invention is not limited to this type of light transmission, but is equally applicable to a signal transmission system wherein the electronic devices are joined by well known methods of connection other than loop-connection.

According to the present invention as has been explained in the foregoing, even when any one, at least, of a plurality of the electronic devices forming the communication system is not in operation for some reason or other, the signal transmission path in the system is changed by detecting the working conditions of the electronic devices, and the input light signal from the first signal transmission path is sent out to the second signal transmission path without interruption, whereby the communication system as a whole can be kept away from interruption in its operation, and reliability to the signal transmission becomes increased. The apparatus according to the present invention is also able to take effect upon the occurrence of an abnormality in the electronic devices, other than the non-operation of the power source devices.

What I claim is:

1. An apparatus constituting a part of a communication system, said apparatus comprising:

an electrically powered input unit for receiving signals from a first signal transmission path;

an electrically powered output unit for sending signals to a second signal transmission path;

an electrically powered signal processing unit for receiving signals from said input unit, for processing the signals and for delivering the processed signals to said output unit;

power supply means for supplying electric power to said input unit, said output unit and said signal processing unit so as to drive said units;

transmission means adapted to directly transmit the signals received by said input unit to said output unit, when said signal processing unit is not in an operable condition; and an input line for taking in electrical power from power supply means of other similar apparatus constituting a part of said communication system, wherein when said signal processing unit is not in an operable condition, said input unit and said output unit are driven with electric power taken in through said input line so as to permit said transmission means to directly transmit the signals received by said input unit to said output unit.

2. A communication system comprising a plurality of apparatuses each as defined in claim 1, wherein when at least one of said apparatuses is operable, the others of said apparatuses are driven with power from the operable ones of said apparatuses.

3. An apparatus according to claim 1, wherein when said signal processing unit is in operable condition, said transmission means is inhibited from operating.

4. An apparatus according to claim 1, wherein each of said first and second signal transmission paths is a light transmission path, said input unit has a photo-to-electric converter which converts light signals into electric signals, and said output unit has an electric-to-photo converter which converts electric signals to light signals.

5. A communication system comprising a plurality of apparatuses each as defined in claim 1, wherein said plurality of apparatuses are linked together in a loop configuration by means of said first and second signal transmission paths.

* * * * *